March 7, 1961  E. A. SCHUERT  2,973,579
FALLOUT PLOTTING DEVICE
Filed Dec. 20, 1957  2 Sheets-Sheet 1

INVENTOR.
EDWARD A. SCHUERT
BY
ATTORNEYS

March 7, 1961

E. A. SCHUERT 2,973,579

FALLOUT PLOTTING DEVICE

Filed Dec. 20, 1957

INVENTOR.
EDWARD A. SCHUERT
BY

United States Patent Office 2,973,579
Patented Mar. 7, 1961

2,973,579

FALLOUT PLOTTING DEVICE

Edward A. Schuert, Berkeley, Calif., assignor to the United States of America as represented by the Secretary of the Navy Filed Dec. 20, 1957, Ser. No. 704,216

2 Claims. (Cl. 33—1)

(Granted under Title 35, U.S. Code (1952), sec. 266)

The invention described herein may be manufactured and used by or for the Government of the United States of America for governmental purposes without the payment of any royalties thereon or therefor.

This invention relates to a plotting device and particularly to one for geographically determining fallout patterns of nuclear detonations.

Various plotting mechanisms have been developed for numerous purposes, such as surveying and map preparation, rate finders respecting quantities of material, force indicators, navigational instruments, determination of wind direction and velocity, linear distance computers, and other similar devices. However, as far as is known, similar devices have not been developed for forecasting the general arrival area of fallout from nuclear detonations.

The tracing of atomic detonation fallouts obviously is a matter of crucial importance and it is highly desirable that the course of the particles, particularly as they near the earth, be determinable not only with accuracy but also with sufficient speed to enable evacuation of such areas as will be affected. As far as is known, the tracing of these fallout particles has been accomplished in the field primarily by drafting procedures which entail quite extensive and complicated calculations for each course which a particle may follow in its descent. As would be expected, such procedures not only are so complicated as to readily admit of error, but they also require the devotion of a substantial amount of time by educated and trained personnel. In some instances, special computers have been provided to eliminate the time and possible error in this drafting procedure, but these computers are relatively expensive and their use again is so complicated as to require the employment of trained personnel.

It is therefore a primary object of this invention to provide a simply operated, expeditious means for conveniently and accurately forecasting the arrival of fallout from detonations.

Another object is to provide such a device which requires no drafting equipment, but renders accurate results that correspond to fallout model theories as well as results that may be quickly and proficiently utilized by untrained personnel in the vicinity of such detonations.

Yet another object is to provide a computer which is flexible but still effects valid results, thereby permitting various parameters affecting descending fallout to be integrated into the final result.

A still further object is to provide a device which will reduce the labor and time of mapping or computing the fallout pattern of nuclear detonations.

One other object is to make available a working tool that meets the needs of the military for solving fallout problems in the field where simplification, speed and accuracy are major criterion.

According to the invention, fallout emanating from a nuclear detonation may be tracked to the earth by a plotter which in its broadest sense may be employed to permit the drawing of a series of vectors to represent the distance a particular sized particle travels through a series of atmospheric layers that decrease in altitude. For example, it may be known that the approximate elevation of a particular detonation is between 30,000 and 35,000 feet and that at this level the wind is traveling at 20 miles per hour and has a true bearing of 170 degrees. Similarly, at 25,000 to 30,000 feet, the data may reveal a wind having a speed of 25 m.p.h. and a true bearing of 190 degrees, and at other decreasing levels such varying information may be known. By use of the present plotter, an initial vector can be drawn using the site of the detonation as its starting point, with the wind speed and its direction at 30,000 to 35,000 feet (the elevation of the detonation) for its magnitude and direction. The plotting board preferably is so arranged that the vector can be drawn on an underlying geographical map, and as already may have been anticipated, other vectors may be drawn for the decreasing elevation layers, such other vectors beginning substantially from the termination point of the preceding vector so as eventually to indicate the point the particle is brought to the earth. Like the first vector, these vectors are determined by the various speeds and directions of the wind.

It is quite apparent that such vectors could be drawn without the use of a particular plotter, but it also is obvious that such drafting would require a substantial amount of calculation and careful lay-out. The present plotter is advantageous primarily because the magnitude of the individual vectors is predetermined and included by way of certain indices, and the direction of the vectors can be readily oriented and drawn simply by rotating or moving the plotter itself in a manner subsequently to be described. The invention also contemplates as an important feature the incorporation on the plotting board itself of the various vector indices, such as the wind speed and direction at particular elevations, and, in this regard, all of the parameters affecting the vector indices become of substantial importance.

The nature of this invention as well as other objects and advantages thereof will be more readily apparent from consideration of the following specification relating to the annexed drawings.

In describing the present invention, the physical structure of the board first will be set forth, following which the operation will be considered with particular attention to prevalent natural conditions which enable such a plotting board to be employed in the intended manner.

Figure 1:
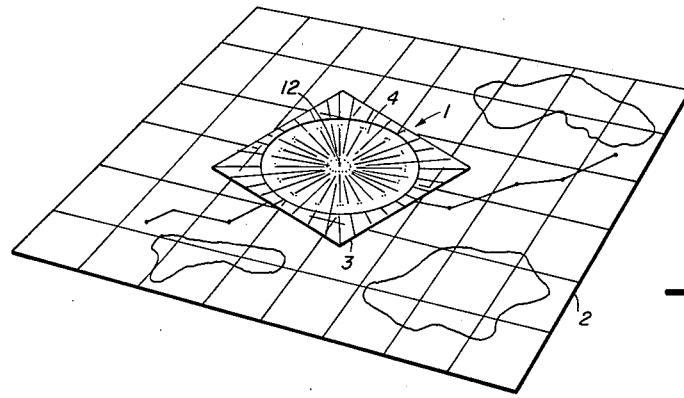
Figure 1 shows the essentials of the computing device in an assembled relationship, positioned over a plotting map.
Figure 2:
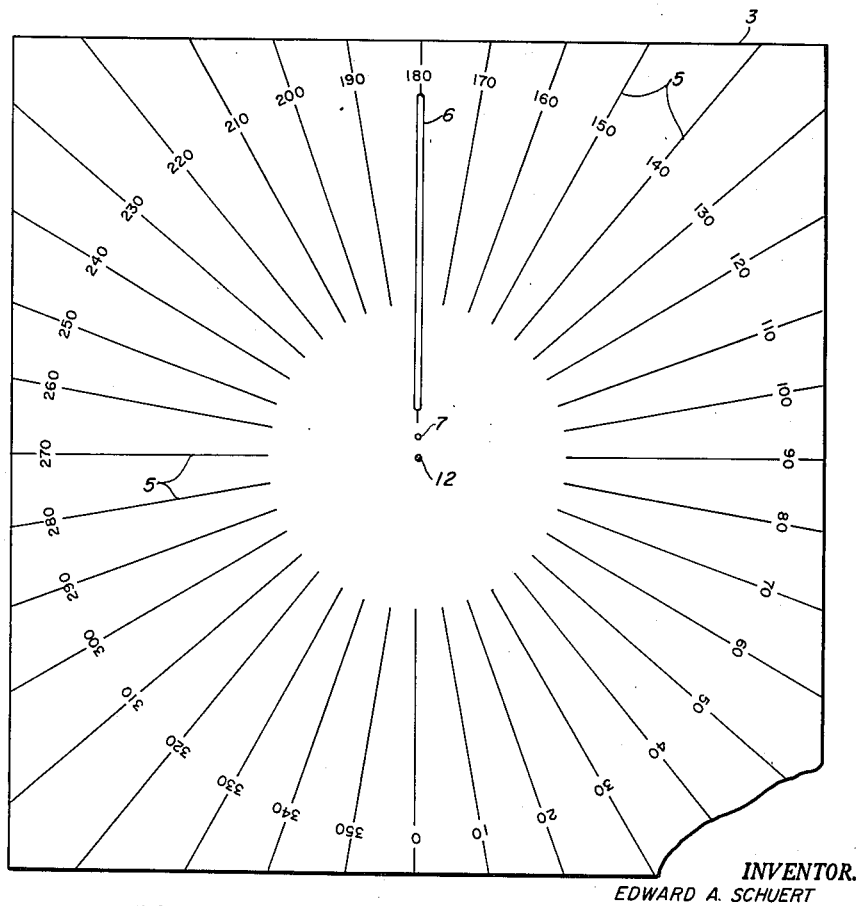
Figure 2 shows a plotter base.
Figure 3:
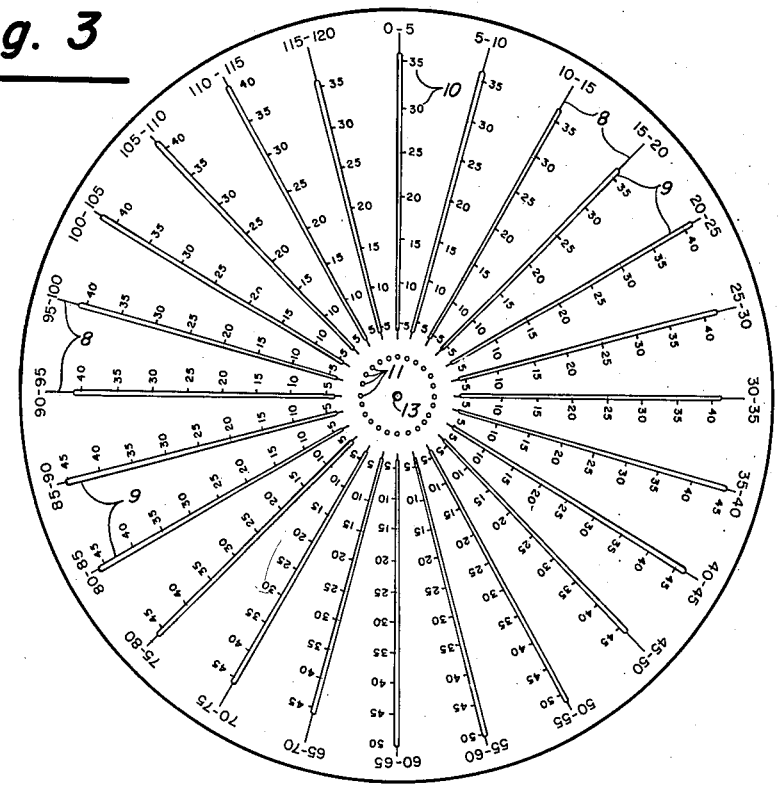
Figure 3 shows a plotter wheel which may be assembled with the base shown in Figure 2.
Figure 4:
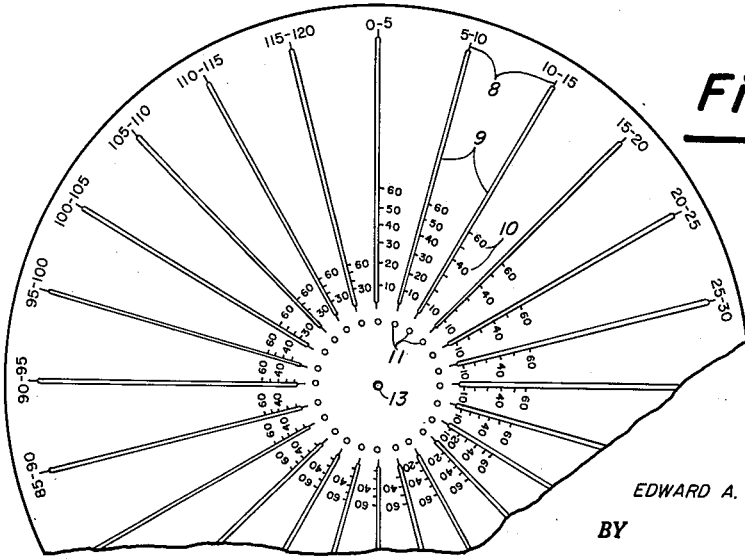
Figure 4 shows a modified plotter wheel which may be used for a different particle.

Referring first to Fig. 1, a plotter, generally indicated by numeral 1, is seen positioned over a map 2, the plotter being made of two parts including a base 3, and a wheel 4. The base, more clearly shown in Fig. 2, is divided by radial lines 5, into 36 sections each comprising 10 degrees of a circle. Along a portion of the line representing 180 degrees a slot 6 is provided as well as an aperture 7, the latter being located near the center of the base. Rotatably supported on the disc is the circular wheel, more clearly shown in Fig. 3, which is divided into 24 equal sections 8, each section indicating a 5000 foot layer of air above the earth's surface. From substantially the center of the wheel to the periphery, radially extending slots 9 are provided for each wind layer section and each of these slots, in turn, is subdivided into various sections 10, marked in multiples of 5, or 10 (Fig. 4) that indicate the wind speeds at radial corresponding atmospheric layers of air. At the inner or central end of each radial slot 9, the wheel also is formed into a plurality of openings 11 that represent zero wind speed for that particular layer of air.

To determine where fallout particles eventually will arrive on the earth's surface, three fundamental factors must be considered, these being the initial distribution of material in the atmosphere; the falling or settling rate thereof; and the wind field through which such material is falling. The first factor amounts to knowledge of the origin of the fallout, respecting such characteristics as size of the particles and distance above the earth. The second amounts to various parametres that actively affect the falling or settling rate of the fallout material in the atmosphere. These consist of the particle's weight, drag coefficient, density, and the density and viscosity of the gas or fluid it is traveling in. The third amounts to the force of the wind and its direction which sends the fallout material in some direction. Naturally, the longer the wind has to act upon the material the more travel thereof is affected, and therefore, a smaller particle will be affected more than a heavier one.

To implement the plotter, the atmosphere is divided into layers and when the speed and direction of the wind is known, along with the falling rate of the particle, horizontal displacement can be plotted. Thus, for each particle size a vector may be drawn for the average particle displacement in each particular layer of air. Addition of such vectors indicates the descending path of a given particle. Similar plotting for particles originating at all elevations will describe the fallout on the earth's surface.

The plotter essentially consists of a base for horizontal geographical orientation and a wheel for the extent of displacement. If a wind direction is given in degrees and its corresponding radial line is oriented to north on the map, the slot becomes oriented in the direction a falling particle is to be displaced. Thus, by proper orientation of the base, for any measured wind direction, the horizontal displacement for the particle may be drawn through the slot of the base. The magnitude of the vector is dependent upon the descending velocity of the particle which, in turn, is generally dependent upon particle density, fluid or atmospheric density and viscosity, particle diameter, and a constant incorporating gravity, which varies. Hence, the device may be used to easily indicate the extent and direction of fallout travel. The manner of determining the falling rate of particles and the motion thereof will subsequently be recited.

Falling minute particles experience three types of motion; namely, streamline or laminous where viscous forces predominate, intermediate where inertia forces predominate, and turbulent flow where inertial forces also predominate. The nature of the motion is determined by the size of the particle and the properties of the fluid it moves in.

Various empirical equations have been formulated to determine the falling rates of particles in a fluid medium. The study of the behavior of fine particles under various conditions, termed micromeritics, has resulted in formulation of various equations. An equation for streamline motion of a particle amounts to the following:

$$V_s=K_s\left(\frac{\rho-\rho o}{\rho o}\right)(d^2)\left(\frac{u}{\rho o}\right)^{-1} \qquad \text{Equation 1}$$

Therefore the terminal velocity, $V_s$, of a particle which undergoes streamline motion is dependent on various factors, consisting of particle density, $\rho$, in grams per cubic centimeter, fluid density, $\rho o$, in grams per cubic centimeter, particle diameter, $d$, in centimeters, absolute viscosity of the fluid $u$, in poises, and a constant incorporating gravity, $K_s$. The value for $K_s$ in respect to sphere shaped particles has been determined, as 54.5 and 36.0 for irregular-shaped particles.

Since streamline motion is largely dependent on viscous forces there is a limiting diameter to which Equation 1 will hold. Proper calculation has determined this by the following equation:

$$d'=\left[\frac{Ku^2}{g\rho(\rho-\rho o)}\right]^{1/3} \qquad \text{Equation 2}$$

Here $d'$ is the limiting diameter of the particle and $g$ the gravitational constant used in physical calculations, the other letters indicating their usual factors, heretofore mentioned. The constant K differs for spheres and irregular-shaped particles. For spheres it may be 54.5 and for irregular-shaped particles 36.0. The practical purposes and the calculations which may be made by the formulas, the streamline region extends from 10 to 150 microns. The altitude of the particle is significant since the parameter's values differ at higher areas. Therefore, for altitudes of some 60,000 feet the streamline region equation is limited to approximately 100 microns.

As implied, when the particle's diameter is greater, it undergoes a different motion or flow, and intermediate motion becomes prevalent. The applicable equation is:

$$V_I=K_I\left[\frac{\rho-\rho o}{\rho o}\right]^{2/3}\left[\frac{u}{\rho o}\right]^{-1/3}d_0 \qquad \text{Equation 3}$$

Here, $d_0$ equals the particle's diameter minus a constant K, multiplied by $d'$, the limiting diameter for streamline motion. The constant, K, has been calculated and determined as 0.4 for sphere-shaped particles and 0.279 for irregular shapes. The value of $K_I$ has been determined for sphere-shapes as 30.0, and 19.0 for irregular-shaped particles. As for streamline motion, a limiting diameter for the equation determining the intermediate motion applies, and this amounts to the following:

$$d''=K\left[\frac{u^2}{g\rho o(\rho-\rho o)}\right]^{1/3} \qquad \text{Equation 4}$$

Here, $d''$ amounts to the limiting diameter for intermediate motion and the constant K, amounts to 43.5 for sphere-shaped particles and 51 for irregular shapes. In practice, the size of the average particle which may undergo such motion is 150 microns with a lower limit of 100 microns and a high of 500.

An equation usable for turbulent motion is indicated by Equation 5 and the constant $K_t$, as calculated, is 54.6 for sphere-shaped particles, and 50 for irregular shapes.

$$V_t=K_t\left[\left(\frac{\rho-\rho o}{\rho}\right)d\right]^{1/2} \qquad \text{Equation 5}$$

The particle size for turbulent motion is quite large and therefore no equation is set forth respecting its limits. Naturally, when the particle is of sufficient density and size the conventional formulas used in physics to determine the falling rate of a comparatively large body may be employed.

The map may be of any convenient type having a plurality of straight lines which form squares. Preferably, landmarks or cities of particular interest should be shown thereon, the purpose being to indicate the geographical location of various areas and to orient interested parties. The map may be of any convenient size and drawn to any particular scale, however, it should be kept in mind that the scale of the map must be considered after the plotting is completed. Therefore, it is best that the map be made of the same scale as the plotter so that no additional calculations or considerations need be made after the plotting is completed.

The plotter base 3 (Figure 2) may be made to any chosen scale such as 1 to 970,000 or 1 inch to 13.2 nautical miles, and since it is necessary to orient the lines of the base and the map, it should be of some suitable transparent material, such as Lucite, so as not to obscure the map. As stated, the base is divided into a series of 36 sections indicated by radial lines 5, each comprising 10 degrees of a circle and beginning some distance from the center thereof extending, or substantially, to the edge thereof. The number of such sections depends upon the number of wind directions to be considered. In fact, each section may be further divided into degrees or portions thereof by some convenient manner such as short lines near the outer edge of the base, but such would be of little practical value. The arrangement of these radial lines and their corresponding degrees have been chosen in the manner shown in the drawings since the wind directions are normally recited in a similar manner, namely, a 180 degree wind has reference to a force coming from due south. As a further example, a 130 degree wind would require orientation of the 180 degree line in the due north direction of the map and the 180 degree line would then be oriented in the direction the wind is blowing to. At the center 12, or some other convenient area of the base, the wheel 4 may be rotatably supported. A short distance beyond the pivot point 12, a small aperture 7, of a suitable size such as 1/16 inch diameter, is provided in the base and located at the end of the 180 degree line, the purpose being to provide a zero point for each vector and also to align sections of the wheel therewith, as will be subsequently discussed. As shown in Fig. 2, beginning a short distance beyond opening 7, a slot 6, of some suitable width such as 1/16 inch is provided. The length of the slot is determined by the longest vector that may be drawn for a particular particle and therefore may extend to the outside edge of the wheel.

The wheel is designed for a particular particle size and like the base is made of a suitable transparent material, such as plastic. It is divided into 24 sections by radial lines 8, each indicating a 5000 foot layer of the atmosphere. Therefore, up to some 120,000 feet of atmosphere may be accounted for. However, the number of sections and therefore the layers of air the wheel is made to include is determined by the number and magnitude of atmospheric layers. The center 13 of the wheel is pivoted at 12, on the base in some convenient manner and slightly beyond the pivotal point some 24 small openings 11, for each radial line are provided, which indicates a zero wind speed for that particular radial line and which are of a suitable size, such as 1/16 inch. Along a portion of each radial line 8, are elongated slots 9, which begin beyond the openings 11, and are of a suitable width preferably similar to that of slot 6 of the base and also along these lines are markings 10, which indicate wind speeds. The distance between the markings 10, is determined by the magnitude of the vector for that increment or layer of atmosphere having a particular wind speed. The slot length is determined by the magnitude of the vector which is dependent upon the horizontal distance that a particle travels during its descent in a particular layer of air. As may be noted from a comparison of Figs. 3 and 4, the wheel for the 350 micron particle shown in Fig. 4 has much shorter slots for corresponding wind speeds. This is since the falling time of the larger particle is less than that of the smaller particle, as indicated by the aforementioned equations.

In construction, both the base and wheel of the device may be made in any chosen shape and to a suitable scale heretofore mentioned. The number of sections to divide the base into is a matter of considered choice and since wind directions are generally given relative to 180 degrees which indicates due north) that system is preferable. Therefore the 180 degree line is located along the radial line corresponding to north on conventional maps. The opening 7 and slot 6 are then made in the base. If a constant falling rate for particles is assumed, then corresponding calculations may be made and proper indices made along the radial line and 180 degree slot. However, experience has shown a wide variation in falling rate and hence, the wheel is certainly preferable. Like the base, the wheel is made of a suitable material and to a preferred scale. The magnitude and number of atmospheric layers are chosen and the wheel is accordingly divided into a corresponding number. Experience has shown that the applicable wind speeds generally do not exceed 60 m.p.h. To determine the horizontal distance a particle will move in a given wind speed, the time of descent of the particle and wind speed must be known.

To determine the falling rate or velocity of the particles, the information respecting the parameters for the equations must be known. The first relates to fall out particle density, and since it originates from the earth, rocks, etc., of the geographical area involved information respecting corresponding geological studies such as has been made by the Department of Agriculture should be obtained. Another respects the density of the gas or fluid which the fallout particles move in and may be gathered from the make up of the atmosphere in that particular area as indicated by a suitable source such as the National Aeronautics and Space Administration (NASA) having information respecting the U.S.A. These factors amount to the temperature and pressure of the atmosphere, which according to the perfect gas law or some other suitable gas law, may be used to calculate the density. Temperature distribution may be obtained from radiosonde runs which have been conventionally used by weather bureaus. Further, temperature data available for the higher altitudes may be gathered from information obtained by the use of rockets in certain areas. The distribution of pressure may be gathered in a similar manner. Considerable information respecting data in the high altitudes is available and has been published in literature respecting physical meteorology and by the NACA. The absolute viscosity of gases and fluids may be computed from known temperature distributions using well known formulas, and physical tables are available for various geographical areas.

In this particular instance the particle diameters which were calculated for have been determined by past tests. Four particle sizes of 75, 100, 200 and 350 microns in diameter have been considered since past experience shows that these sizes best describe the pattern of fallout. The 75 micron particle defines the limiting distance of fallout of interest and the larger sizes describe the pattern within such limit. The wheel of Fig. 3 is for 75 microns and that of Fig. 4 is for 350 microns.

Upon determination of the necessary data the calculation for a particular particle size may be made and the falling rate will indicate the time necessary to pass through a particular layer of air. The direction and speed of the wind will then indicate the direction and magnitude of the horizontal travel of the particles. Each atmospheric layer is then accounted for and the slots 9, accordingly, cut into the wheel. The wind indices will be separated according to the falling rate of a particular particle and the wind speed itself.

In some instances large cellular vertical motions in the atmosphere attain speeds equal to and greater than the settling speed of the particles. A time-space correction may be made for the falling speeds of the particles to compensate for this parameter.

In use, the plotter is positioned over a plotting map and in accordance with a given wind direction the base is orientated accordingly. The opening 7, is positioned directly over the position corresponding to the nuclear detonation. The height of the detonation is determined and the corresponding section of the wheel is positioned over the 180 degree slot, 6. A vector is drawn through the wheel and base for that particular altitude of air in accordance with the wind speed and the vector length is determined in part by the falling rate and in part by the wind speed. The procedure is repeated for each atmospheric layer. Upon completion, a path of the particle's horizontal travel may be seen. Due to the simplicity of the plotter, it may be easily operated for conveniently forecasting the arrival of fallout from detonations, and no drafting equipment is required, therefore not requiring specially trained personnel for operation. Because of the careful construction of the device, and the built-in computations of falling rates, accurate effects that correspond to fall out model theories results. Further, due to the various parameters that may be incorporated into each specific wheel that is employed the plotter is flexible in the sense that it may be developed for any chosen geographical area. Hence, valid results are effective in each instance.

It should be understood, of course, that the foregoing disclosure related to only preferred embodiments of the invention and that it is intended to cover all changes and modifications of the examples of the invention herein chosen for the purpose of disclosure, which do not constitute departures from the spirit and scope of the invention.

Obviously many modifications and variations of the present invention are possible in the light of the above teachings. It is therefore to be understood that within the scope of the appended claims the invention may be practiced otherwise than as specifically described.

What is claimed is:

1. A plotting device for determining the fallout pattern of nuclear detonations comprising a transparent base carrying radial lines indicating wind direction by degrees and provided with a radial slot along the 180 degree line, an aperture located as the center of said radial lines and a pivot point in radial alignment with said slot, a transparent wheel rotatively mounted on said base at said pivot point and provided with a plurality of radial slots representing increments of altitude and carrying indices of the speed of nuclear particles at said altitude increments, said wheel being adapted to be rotated whereby the respective radial slots may be selectively brought into coincidence with the 180 degree slot in said base for tracing the fallout vector on a plot plan.

2. A plotting device for geographically determining the fallout pattern of nuclear detonations comprising a plot plan of the area of detonation bearing north-south indices, a transparent base carrying radial lines indicating wind direction adapted to be superimposed on said plot plan, a pivot point and an aperture offset therefrom in said base, a radial slot positioned along one of the radial lines of said base for indicating wind direction in the 180 degree position and extending from a point adjacent said aperture toward the peripheral edge of said base, said slot, pivot point, and aperture being in radial alignment, the extensions of said base lines for indicating wind direction radiate from said aperture as a center, a transparent wheel rotatively mounted on said base at said pivot point and provided with a plurality of radial slots representing increments of altitude and carrying indices of the speed of nuclear particles at said altitude increments, a plurality of plotting holes on said wheel, one for each radial slot arranged in a circular path and positioned to coincide respectively with said aperture of the base and represent zero wind speeds, and means for rotating said wheel on said base whereby the selected radial slot representing the correct altitude and particle speed and the adjacent plotting hole are coincident with the 180 degree wind direction slot and offset aperture for tracing the fallout vector on said plot plan.

References Cited in the file of this patent
UNITED STATES PATENTS

| | | |
|---|---|---|
| 2,190,071 | Keppers | Feb. 13, 1940 |
| 2,775,404 | Lahr | Dec. 25, 1956 |